US012764801B2

(12) United States Patent
Zheng

(10) Patent No.: US 12,764,801 B2
(45) Date of Patent: Oct. 13, 2026

(54) SYSTEM MESSAGE TRANSMISSION METHOD, TERMINAL DEVICE, AND NETWORK DEVICE

(71) Applicant: VIVO MOBILE COMMUNICATION CO., LTD., Guangdong (CN)

(72) Inventor: Qian Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 489 days.

(21) Appl. No.: 18/106,527

(22) Filed: Feb. 7, 2023

(65) Prior Publication Data

US 2023/0189356 A1 Jun. 15, 2023

Related U.S. Application Data

(63) Continuation of application No. PCT/CN2021/112115, filed on Aug. 11, 2021.

(30) Foreign Application Priority Data

Aug. 13, 2020 (CN) ......................... 202010814279.2

(51) Int. Cl.

| | |
|---|---|
| ***H04W 76/10*** | (2018.01) |
| ***H04W 76/20*** | (2018.01) |
| ***H04W 88/04*** | (2009.01) |
| ***H04W 92/18*** | (2009.01) |

(52) U.S. Cl.

CPC ........... *H04W 76/10* (2018.02); *H04W 76/20* (2018.02); *H04W 88/04* (2013.01); *H04W 92/18* (2013.01)

(58) Field of Classification Search

CPC ...... H04W 76/10; H04W 76/20; H04W 88/04

See application file for complete search history.

(56) References Cited

U.S. PATENT DOCUMENTS

| | | | | |
|---|---|---|---|---|
| 11,234,184 B1 * | 1/2022 | Lee | ........................ | H04W 72/30 |
| 2014/0171062 A1 | 6/2014 | Fallgren et al. | | |
| 2018/0092027 A1 * | 3/2018 | Sheng | .................... | H04W 48/08 |
| 2018/0098370 A1 | 4/2018 | Bangolae et al. | | |
| 2018/0199390 A1 | 7/2018 | Hahn et al. | | |
| 2018/0270865 A1 | 9/2018 | Mallick et al. | | |
| 2019/0230713 A1 | 7/2019 | Geng et al. | | |
| 2019/0306784 A1 * | 10/2019 | Chen | ...................... | H04W 76/15 |
| 2019/0320311 A1 | 10/2019 | Wang et al. | | |
| 2019/0320443 A1 | 10/2019 | Wang et al. | | |

(Continued)

FOREIGN PATENT DOCUMENTS

| | | |
|---|---|---|
| AU | 2017438105 A1 | 6/2020 |
| CN | 107637162 A | 1/2018 |

(Continued)

OTHER PUBLICATIONS

LG Electronics Inc., SI message delivery for remote UE, Discussion and Decision, 3GPP TSG-RAN WG2 Meeting #97, R2-1701351, 13th-17th Feb. 17, 2017, Athens, Greece.

*Primary Examiner* — Parth Patel

(74) *Attorney, Agent, or Firm* — Price Heneveld LLP

(57) ABSTRACT

This application discloses a system message transmission method, a terminal device, and a network device, and pertains to the field of communications. The method includes: sending a first request for system information or system information block to a relay terminal; and receiving a target system information or system information block sent by the relay terminal.

17 Claims, 9 Drawing Sheets

400

(56) References Cited

U.S. PATENT DOCUMENTS

| | | | | |
|---|---|---|---|---|
| 2019/0342904 | A1 | 11/2019 | Islam et al. | |
| 2019/0380159 | A1* | 12/2019 | Bangolae | H04W 76/14 |
| 2020/0068489 | A1* | 2/2020 | Li | H04W 4/06 |
| 2020/0091991 | A1 | 3/2020 | Fujishiro et al. | |
| 2020/0245226 | A1 | 7/2020 | Kuang et al. | |
| 2021/0120476 | A1* | 4/2021 | Lee | H04W 48/10 |
| 2021/0195503 | A1* | 6/2021 | Tang | H04W 72/23 |
| 2022/0312535 | A1* | 9/2022 | Wu | H04L 65/1016 |
| 2022/0338283 | A1* | 10/2022 | Wang | H04W 76/14 |
| 2023/0189356 | A1* | 6/2023 | Zheng | H04W 76/10 370/329 |
| 2023/0209464 | A1* | 6/2023 | Tsai | H04W 52/0216 370/311 |
| 2023/0224802 | A1* | 7/2023 | Cheng | H04W 40/22 370/328 |
| 2023/0308991 | A1* | 9/2023 | Zhang | H04W 48/14 |

FOREIGN PATENT DOCUMENTS

| | | | | |
|---|---|---|---|---|
| CN | 107889190 | A | 4/2018 | |
| CN | 108307528 | A | 7/2018 | |
| CN | 110073685 | A | 7/2019 | |
| CN | 110100463 | A | 8/2019 | |
| CN | 110351882 | A | 10/2019 | |
| CN | 110402601 | A | 11/2019 | |
| KR | 20140081502 | A | 7/2014 | |
| WO | 2017155291 | A2 | 9/2017 | |
| WO | 2018119641 | A1 | 7/2018 | |
| WO | 2018194390 | A1 | 10/2018 | |
| WO | 2018216774 | A1 | 11/2018 | |
| WO | WO 2022/017378 | A1 * | 1/2022 | H04L 5/00 |

* cited by examiner

500

SYSTEM MESSAGE TRANSMISSION METHOD, TERMINAL DEVICE, AND NETWORK DEVICE

CROSS-REFERENCE TO RELATED APPLICATIONS

The present application is a bypass continuation application of International Application No. PCT/CN2021/112115 filed on Aug. 11, 2021, which claims priority to Chinese Patent Application No. 202010814279.2, filed with the China National Intellectual Property Administration on Aug. 13, 2020 and entitled "SYSTEM MESSAGE TRANSMISSION METHOD, TERMINAL DEVICE, AND NETWORK DEVICE", which are incorporated herein by reference in their entireties.

TECHNICAL FIELD

Embodiments of the present invention relate to the field of communications, and in particular, to a system message transmission method, a terminal device, and a network device.

BACKGROUND

In new radio (NR), the relay technology in a sidelink (SL) communications system allows addition of one or more relay nodes between a base station and a terminal to forward radio signals for one or more times. That is, the radio signals need to pass through multiple hops before reaching the terminal. The radio relay technology can be used to expand cell coverage and make up for blind spots in cell coverage, and also improve cell capacity through spatial resource multiplexing. For indoor coverage, the relay technology can also play a role in overcoming penetration loss and improving indoor coverage quality.

A two-hop relay is used as an example. A radio relay divides a link from the base station to the terminal into two links, one from the base station to a relay station and the other from the relay station to the terminal, so as to replace one link of poor quality with two links of better quality to achieve higher link capacity and better coverage. One end of a relay is connected to a user terminal (User Equipment, UE), and another end is connected to the network side. UE connected to the relay is remote UE.

The remote UE passively receives system messages, that is, the relay UE forwards all or part of the system messages received to the remote UE, and the remote UE cannot receive system messages according to its own needs.

SUMMARY

Embodiments of this application are intended to provide a system message transmission method, a terminal device, and a network device.

According to a first aspect, a system message transmission method is provided, where the method is executed by a remote terminal, and the method includes: sending a first request for system information SI or system information block SIB to a relay terminal; and receiving a target SI or SIB sent by the relay terminal.

According to a second aspect, a system message transmission method is provided, where the method is executed by a relay terminal, and the method includes: receiving a first request for system information SI or system information block SIB sent by a remote terminal; and sending a target SI or SIB to the remote terminal.

According to a third aspect, a system message transmission method is provided, where the method is executed by a network device, and the method includes: receiving a second request for SI or SIB sent by a relay terminal, where the second request includes a SI or SIB requirement of a remote terminal; and sending a target SI or SIB in response to the second request.

According to a fourth aspect, a system message transmission apparatus is provided, including: a first sending module, configured to send a first request for system information SI or system information block SIB to a relay terminal; and a first receiving module, configured to receive a target SI or SIB sent by the relay terminal.

According to a fifth aspect, a system message transmission apparatus is provided, including: a second receiving module, configured to receive a first request for system information SI or system information block SIB sent by a remote terminal; and a second sending module, configured to send a target SI or SIB to the remote terminal.

According to a sixth aspect, a system message transmission apparatus is provided, including: a third receiving module, configured to receive a second request for SI or SIB sent by a relay terminal, where the second request includes a SI or SIB requirement of a remote terminal; and a third sending module, configured to send a target SI or SIB in response to the second request.

According to a seventh aspect, a terminal device is provided, where the terminal device includes a processor, a memory, and a program or instructions stored in the memory and capable of running on the processor, and when the program or instructions are executed by the processor, the steps of the method according to the first aspect or the second aspect are implemented.

According to an eighth aspect, a network device is provided, where the network device includes a processor, a memory, and a program or instructions stored in the memory and capable of running on the processor, and when the program or instructions are executed by the processor, the steps of the method according to the third aspect are implemented.

According to a ninth aspect, a readable storage medium is provided, where a program or instructions are stored in the readable storage medium, and when the program or instructions are executed by a processor, the steps of the method according to the first aspect, the second aspect, or the third aspect are implemented.

According to a tenth aspect, a computer program product is provided, where the computer program is stored in a non-volatile memory, and when the computer program product is executed by a processor, the steps of the method according to the first aspect, the second aspect, or the third aspect are implemented.

According to an eleventh aspect, an embodiment of this application provides a chip, where the chip includes a processor and a communications interface, the communications interface is coupled to the processor, and the processor is configured to run a program or instructions to implement the method according to the first aspect, the second aspect, or the third aspect.

BRIEF DESCRIPTION OF DRAWINGS

The accompanying drawings described herein are intended for better understanding of this application and constitute a part of this application. Illustrative embodiments and descriptions thereof in this application are intended to interpret this application without constituting any improper limitation on this application. In the accompanying drawings.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-Advanced (LTE-A) system, and may also be applied to other wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
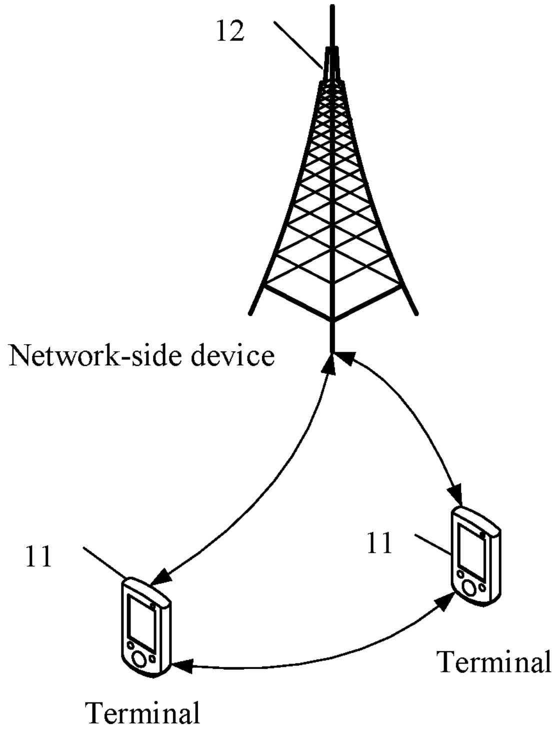
FIG. 1 is a block diagram of a wireless communications system to which the embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a system message transmission method provided in the embodiments of this application by using specific embodiments and application scenarios thereof with reference to the accompanying drawings.

Figure 2:
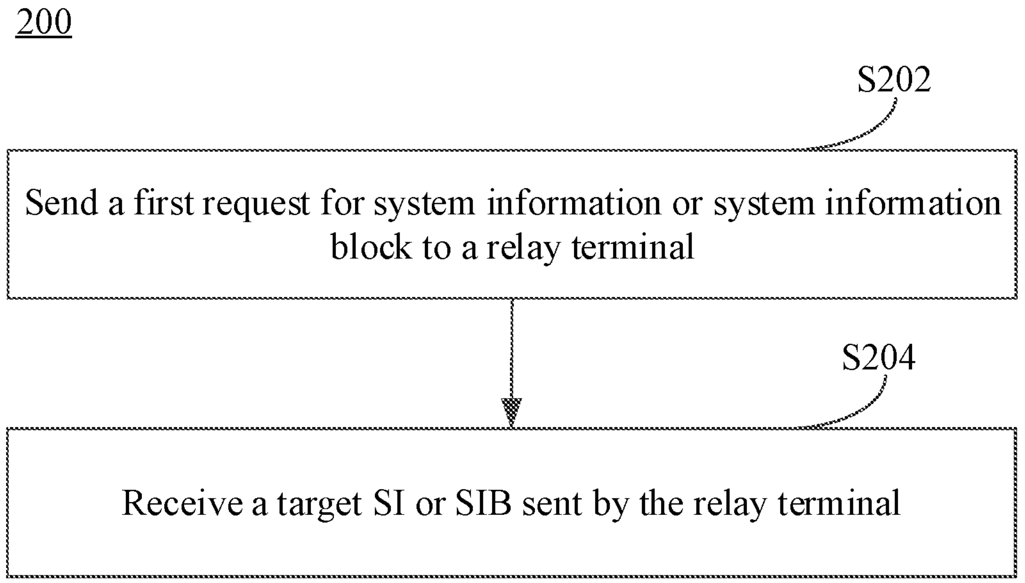
FIG. 2 is a schematic flowchart of a system message transmission method according to an embodiment of the present invention.

As shown in FIG. 2, an embodiment of the present invention provides a system message transmission method 200. The method may be executed by a remote terminal device. In other words, the method may be executed by software or hardware installed in the terminal device. The method includes the following steps.

S202: Send a first request for system information or system information block to a relay terminal.

Optionally, the first request for system information (SI) or system information block (SIB) includes at least one of the following content:

a SI or SIB requirement of the remote terminal; and a first random access channel (RACH) resource configuration and a mapping relationship between the requirement and the first RACH resource, where the first RACH resource is a resource that is configured by a network or preconfigured and that is used for transmitting the first request for SI or SIB.

S204: Receive a target SI or SIB sent by the relay terminal.

In response to the first request, the relay terminal sends, to the remote terminal, the target SI or SIB corresponding to the first request. In other words, the target SI or SIB corresponds to the SI or SIB requirement of the remote terminal.

Optionally, the remote terminal is in RRC_CONNECTED state, or RRC_IDLE state, or RRC_INACTIVE state. For example, the SI or SIB requirement can be a message of Remote UE Information Sidelink, and the message is used to request SI or SIB.

According to the system message transmission method provided in this embodiment of the present invention, the first request for SI or system information block SIB is sent to the relay terminal; and the target SI or SIB sent by the relay terminal is received, so that the remote UE can receive system messages according to requirements. Because obtaining system messages is customized based on requirements of the remote UE, resource overheads can be reduced and communications efficiency of the sidelink relay can be improved.

Figure 3:
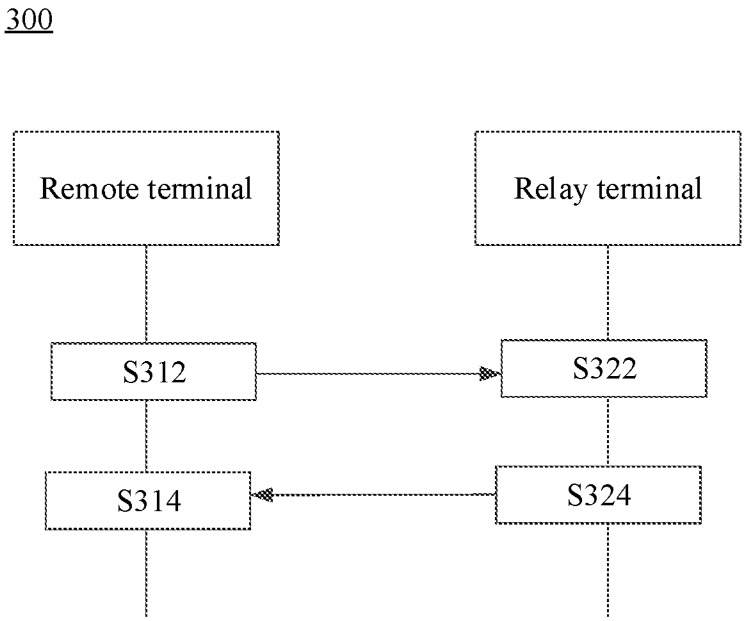
FIG. 3 is a schematic flowchart of a system message transmission method according to an embodiment of the present invention.

As shown in FIG. 3, an embodiment of the present invention provides a system message transmission method 300. The method may be executed by a remote terminal device and/or a network device. In other words, the method may be executed by software or hardware installed in the terminal device and/or the network device. The method includes the following steps.

S312: The remote terminal sends a first request for SI or SIB to a relay terminal.

This step may use the same description as step S202 in the embodiment of FIG. 2, and repeated parts are not described herein again.

A sending mode of the first request for SI or SIB is at least one of the following sending modes:

- sending by using a PC5 radio resource control (RRC) message;
- sending by using an information element in a PC5 RRC message; and
- sending by using a Uu RRC container in a PC5 RRC message.

S322: The relay terminal receives the first request for system information or system information block sent by the remote terminal.

S324: The relay terminal sends a target SI or SIB to the remote terminal.

The relay terminal obtains a SI or SIB requirement of the remote UE based on information that is obtained by parsing the first request.

In an implementation, a sending mode of sending the target SI or SIB to the remote terminal is at least one of the following sending modes:

- sending by using a PC5 radio resource control RRC message, where, for example, a new PC5 RRC message is introduced to send the target SI/SIB or an existing PC5 RRC message is used to send the target SI/SIB;
- sending by using an information element in a PC5 RRC message, where, for example, a new information element (IE) is introduced to the PC5 RRC message to send the target SI/SIB; and
- sending by using a Uu RRC container in a PC5 RRC message, where, for example, a Uu RRC container is introduced to the PC5 RRC message to send the target SI/SIB.

In an implementation, in a case that a stored SI or SIB matches a system message currently broadcast by a network device, the relay terminal sends the stored SI or SIB to the remote terminal.

S314: The remote terminal receives the target SI or SIB sent by the relay terminal.

According to the system message transmission method provided in this embodiment of the present invention, the first request for SI or SIB is sent to the relay terminal; and the target SI or SIB sent by the relay terminal is received, so that the remote UE can receive system messages according to requirements. Because obtaining system messages is customized based on requirements of the remote UE, resource overheads can be reduced and communications efficiency of the sidelink relay can be improved.

Figure 4:
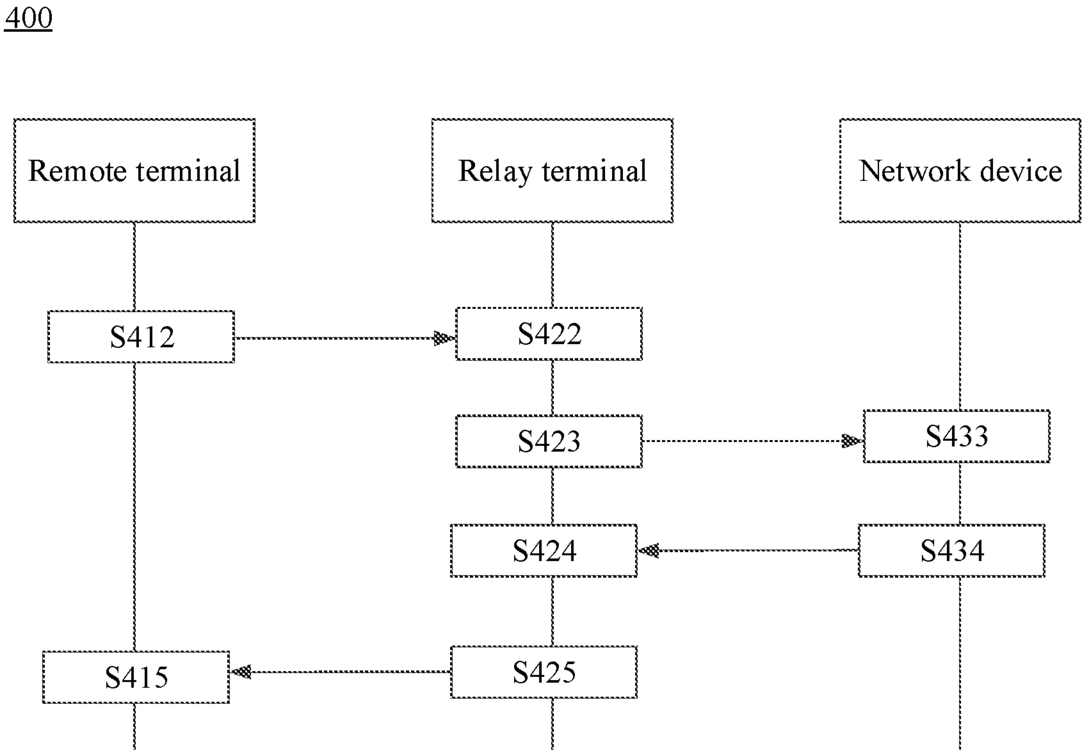
FIG. 4 is a schematic flowchart of a system message transmission method according to an embodiment of the present invention.

As shown in FIG. 4, an embodiment of the present invention provides a system message transmission method 400. The method may be executed by a remote terminal device and/or a network device. In other words, the method may be executed by software or hardware installed in the terminal device and/or the network device. The method includes the following steps.

S412: The remote terminal sends a first request for SI or SIB to a relay terminal.

This step may use the same description as step S202 in the embodiment of FIG. 2 and step S312 in the embodiment of FIG. 3, and repeated parts are not described herein again.

The remote terminal sends the first request for SI or SIB to the relay terminal in a case that a trigger condition is satisfied.

In an implementation, the trigger condition includes at least a first trigger condition, and the first trigger condition is at least one of the following conditions:

- Uu quality being lower than a predetermined threshold;
- being located out of network coverage (out-of-coverage, OOC);
- a PC5 connection to the relay terminal having been established successfully;
- predetermined indication information from an upper layer to an access stratum having been received, where the predetermined indication information includes at least one of the following information: notification of successful establishment of a PC5-S connection to the relay terminal, information about presence of user data to be sent or received, and information about presence of upper layer signaling to be sent or received; and
- a first RACH resource for transmitting the first request for SI or SIB having been configured by a network or preconfigured, where the first RACH resource is specially used for the first request for SI or SIB.

S422: The relay terminal receives the first request for SI or SIB sent by the remote terminal.

The relay terminal obtains a SI or SIB requirement of the remote terminal by parsing the first request.

S423: The relay terminal sends a second request for SI or SIB to the network device to obtain a target SI or SIB.

The second request includes the SI or SIB requirement of the remote terminal.

In an implementation, in a case that a stored SI or SIB does not match a system message currently broadcast by the network device, the second request for SI or SIB is sent to the network device to obtain the target SI or SIB.

In another implementation, in a case that no SI or SIB is stored, a second request for SI or SIB is sent to the network device to obtain the target SI or SIB.

Optionally, the second request for SI or SIB may be sent by using the first RACH resource in the first request; or the second request for SI or SIB may be sent by using a second RACH resource configured by the network. The first RACH resource is configured for the remote terminal and forwarded by the remote terminal using the first request to the relay terminal for use. The second RACH resource is configured for the relay terminal for dedicated use.

S433: The network device receives the second request for SI or SIB sent by the relay terminal.

The RACH resource may be specially used to distinguish whether the SI or SIB request is for the relay UE itself, so that the base station can process the SI or SIB request forwarded for the remote UE differently from the SI or SIB request of the relay UE itself.

S434: The network device sends the target SI or SIB in response to the second request.

The network device sends the target SI or SIB through broadcast or by using dedicated RRC signaling. Specifically, in a case that the first trigger condition is satisfied, the target SI or SIB is broadcast by the network device or sent by the network device by using dedicated RRC signaling. The target SI or SIB corresponds to the SI or SIB requirement of the remote terminal.

S424: The relay terminal receives the target SI or SIB sent by the network device.

In a case that the first trigger condition is satisfied, the target SI or SIB sent by the network device through broadcast or by using dedicated RRC signaling is received.

In an implementation, the relay terminal stores the target SI or SIB, so that in a subsequent procedure, when the SI or SIB stored in this step matches a system message currently broadcast by the network device, the stored SI or SIB is sent to the remote terminal, with no need to send the second request to the network device. For details, refer to the description of step S324 in the embodiment of FIG. 3.

S425: The relay terminal sends the target SI or SIB to the remote terminal.

A sending mode of sending the target SI or SIB to the remote terminal by the relay terminal is similar to the description of step S324 in the embodiment of FIG. 3, and details are not repeated herein.

S415: The remote terminal receives the target SI or SIB sent by the relay terminal.

According to the system message transmission method provided in this embodiment of the present invention, the first request for SI or SIB is sent to the relay terminal in the case that the trigger condition is satisfied; and the target SI or SIB sent by the relay terminal is received, so that the remote UE can receive the system message according to requirements and the remote UE even located out of network coverage can obtain the system message broadcast by the base station. Because obtaining system messages is customized based on requirements of the remote UE, resource overheads can be reduced and communications efficiency of the sidelink relay can be improved.

Figure 5:
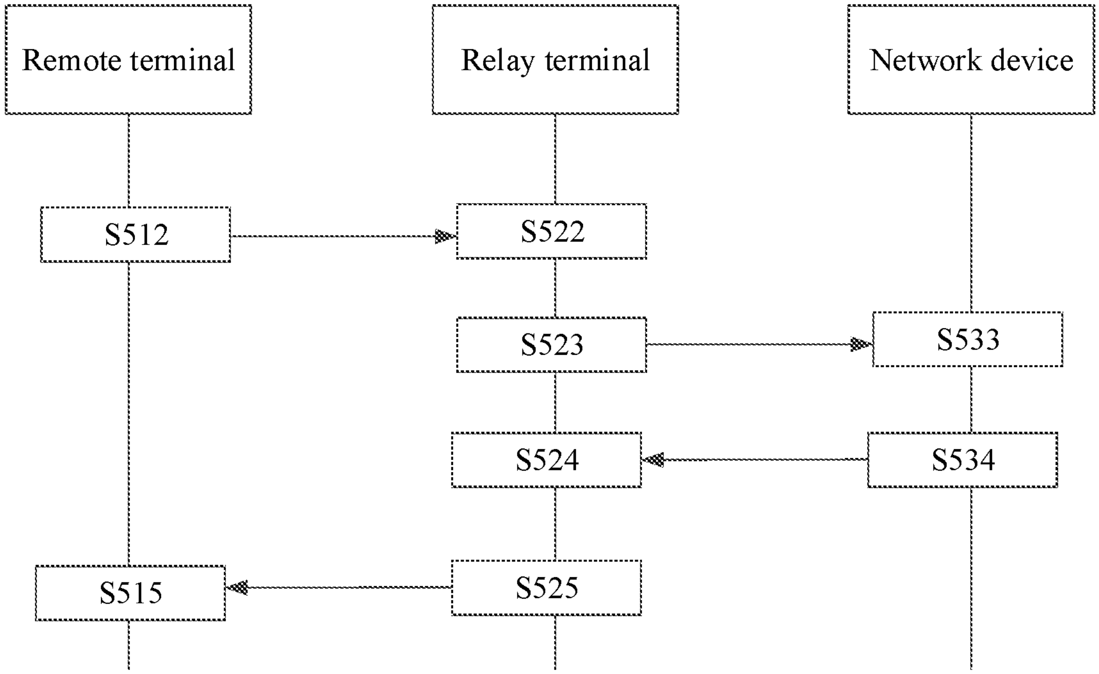
FIG. 5 is a schematic flowchart of a system message transmission method according to an embodiment of the present invention.

As shown in FIG. 5, an embodiment of the present invention provides a system message transmission method 500. The method may be executed by a remote terminal device and/or a network device. In other words, the method may be executed by software or hardware installed in the terminal device and/or the network device. The method includes the following steps.

S512: The remote terminal sends a first request of SI or SIB to a relay terminal, and starts or restarts a prohibit timer.

A sending mode of sending the first request for SI or SIB to the relay terminal by the remote terminal is similar to step S312 in the embodiment of FIG. 3, and details are not repeated herein.

In an implementation, in a case that a prohibit timer for allowing a dedicated SI or SIB request has been configured, after the sending the first request of SI or SIB to the relay terminal, the method further includes: starting or restarting the prohibit timer.

S522: The relay terminal receives the first request for SI or SIB sent by the remote terminal.

The relay terminal obtains a SI or SIB requirement of the remote terminal by parsing the first request.

The first request for SI or SIB is sent to the relay terminal in a case that a trigger condition is satisfied.

In an implementation, the trigger condition further includes a second trigger condition in addition to the first trigger condition described in step S422 in the embodiment of FIG. 4. In a case that the second trigger condition is satisfied, a target SI or SIB sent by the network device by using dedicated RRC signaling is received.

The second trigger condition is at least one of the following conditions:

that an indication for allowing a dedicated SI or SIB request has been configured; and that a prohibit timer for allowing a dedicated SI or SIB request has been configured and the prohibit timer is in a non-running state.

S523: The relay terminal sends a second request for SI or SIB to the network device to obtain the target SI or SIB.

This step uses the same description as step S423 in the embodiment of FIG. 4, and details are not repeated herein.

S533: The network device receives the second request for SI or SIB sent by the relay terminal.

S534: The network device sends the target SI or SIB in response to the second request.

In a case that the second trigger condition is satisfied, the target SI or SIB is sent by the network device by using dedicated RRC signaling. The target SI or SIB corresponds to the SI or SIB requirement of the remote terminal.

S524: The relay terminal receives the target SI or SIB sent by the network device.

In the case that the second trigger condition is satisfied, the target SI or SIB sent by the network device by using dedicated RRC signaling is received.

S525: The relay terminal sends the target SI or SIB to the remote terminal.

A sending mode of sending the target SI or SIB to the remote terminal by the relay terminal is similar to the description of step S324 in the embodiment of FIG. 3, and details are not repeated herein.

S515: The remote terminal receives the target SI or SIB sent by the relay terminal, and stops the prohibit timer.

In an implementation, in the case that the prohibit timer for allowing the dedicated SI or SIB request has been configured, after the target SI or SIB sent by the relay terminal is received, the prohibit timer is stopped.

In addition, in another implementation, before the target SI or SIB sent by the relay terminal is received, the prohibit timer may alternatively be stopped in advance in a case that a stop timing condition is satisfied, where the stop timing condition includes at least one of the following conditions:

that radio link transmission fails on a sidelink to the relay terminal;

that a PC5 connection to the relay terminal has been released; and that a reselection condition for the relay terminal is satisfied.

According to the system message transmission method provided in this embodiment of the present invention, the first request for SI or SIB is sent to the relay terminal in the case that the trigger condition is satisfied; and the target SI or SIB sent by the relay terminal is received, so that the remote UE can receive the system message according to requirements and the remote UE even located out of network coverage can obtain the system message broadcast by the base station. Because obtaining system messages is customized based on requirements of the remote UE, resource overheads can be reduced and communications efficiency of the sidelink relay can be improved.

Figure 6:
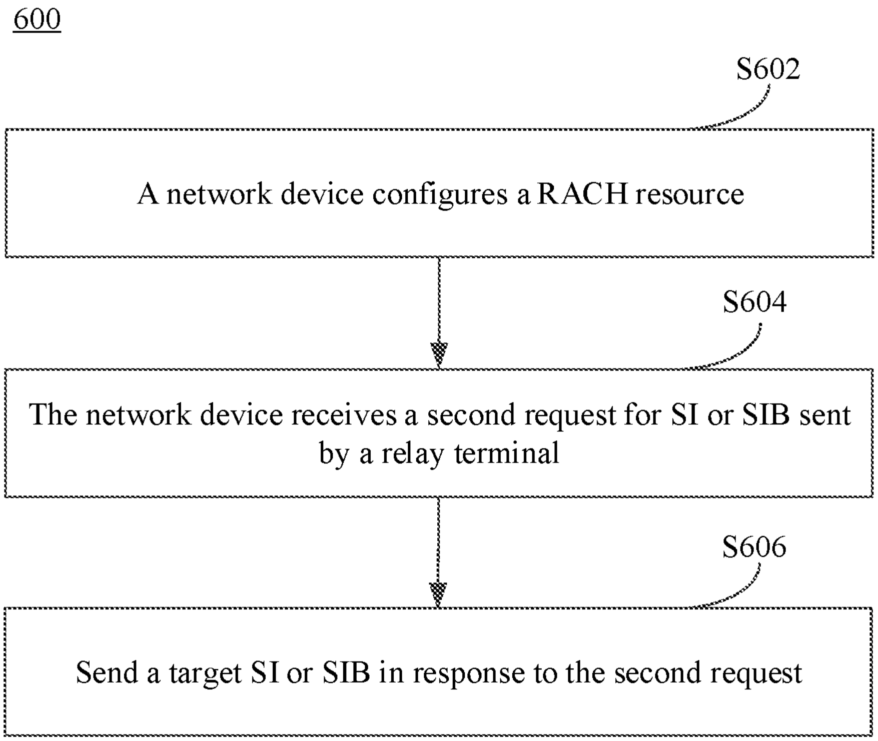
FIG. 6 is a schematic flowchart of a system message transmission method according to another embodiment of the present invention.

As shown in FIG. 6, an embodiment of the present invention provides a system message transmission method 600. The method may be executed by a network device. In other words, the method may be executed by software or hardware installed in the network device. The method includes the following steps.

S602: The network device configures a RACH resource. This step includes at least one of the following:

configuring, for a remote terminal, a first RACH resource for transmitting a first request for SI or SIB; and configuring, for a relay terminal, a second RACH resource for transmitting a second request for SI or SIB, where the network device performing this step and the network device performing the following steps S604 to S606 may be the same network device or different network devices, for example, a base station gNB1 performs this step, and a gNB2 performs the following steps S604 to S606.

S604: The network device receives the second request for SI or SIB sent by the relay terminal.

The second request includes a SI or SIB requirement of the remote terminal. This step may use the same description of the step of receiving the second request by the network device in the embodiments of FIG. 3 to FIG. 5, and details are not repeated herein.

S606: Send a target SI or SIB in response to the second request.

This step may use the same description of the step of sending the target SI or SIB by the network device in the embodiments of FIG. 3 to FIG. 5, and details are not repeated herein.

According to the system message transmission method in this embodiment of the present invention, the network device configures, for the remote terminal, the first RACH resource for transmitting the first request for SI or SIB, and configures, for the relay terminal, the second RACH resource for transmitting the second request for SI or SIB, so that remote UEs can receive system messages according to requirements.

It should be noted that, for the system message transmission method provided in the embodiments of this application, the execution body may be a system message transmission apparatus, or a control module for executing the method in the apparatus. In the embodiments of this application, the system message transmission method provided in the embodiments of this application is described by using the system message transmission method being executed by the system message transmission apparatus as an example.

Figure 7A:
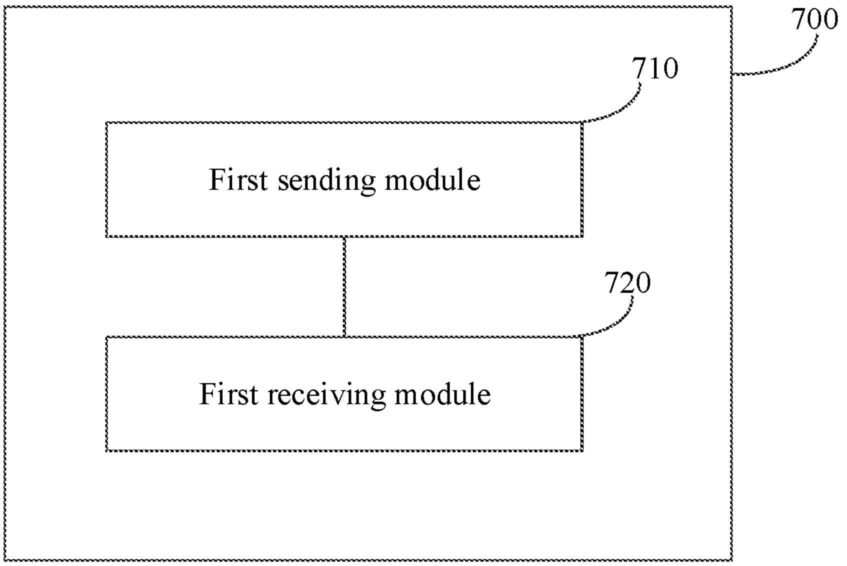
FIG. 7*a* and FIG. 7*b* are schematic structural diagrams of a system message transmission apparatus according to an embodiment of the present invention.

FIG. 7*a* is a schematic structural diagram of a system message transmission apparatus according to an embodiment of the present invention. As shown in FIG. 7*a*, the system message transmission apparatus 700 includes: a first sending module 710 and a first receiving module 720.

The first sending module 710 is configured to send a first request for system information SI or system information block SIB to a relay terminal. The first receiving module 720 is configured to receive a target SI or SIB sent by the relay terminal.

In an implementation, the first sending module 710 is configured to send the first request for system information SI or SIB to the relay terminal in a case that a trigger condition is satisfied.

In an implementation, the trigger condition includes at least a first trigger condition, and the first trigger condition is at least one of the following conditions: Uu quality being lower than a predetermined threshold; being located out of network coverage; a PC5 connection to the relay terminal having been established successfully; predetermined indication information from an upper layer to an access stratum having been received; and a first RACH resource for transmitting the first request for SI or SIB having been configured by a network or preconfigured.

In an implementation, in a case that the first trigger condition is satisfied, the target SI or SIB is broadcast by a network device or sent by the network device by using dedicated RRC signaling.

In an implementation, the predetermined indication information includes at least one of the following information: notification of successful establishment of a PC5-S connection to the relay terminal, information about presence of user data to be sent or received, and information about presence of upper layer signaling to be sent or received.

In an implementation, the trigger condition may further include a second trigger condition, and the second trigger condition is at least one of the following conditions: that an indication for allowing a dedicated SI or SIB request has been configured; and that a prohibit timer for allowing a dedicated SI or SIB request has been configured and the prohibit timer is in a non-running state.

In an implementation, in a case that the second trigger condition is satisfied, the target SI or SIB is sent by the network device by using dedicated RRC signaling.

Figure 7B:
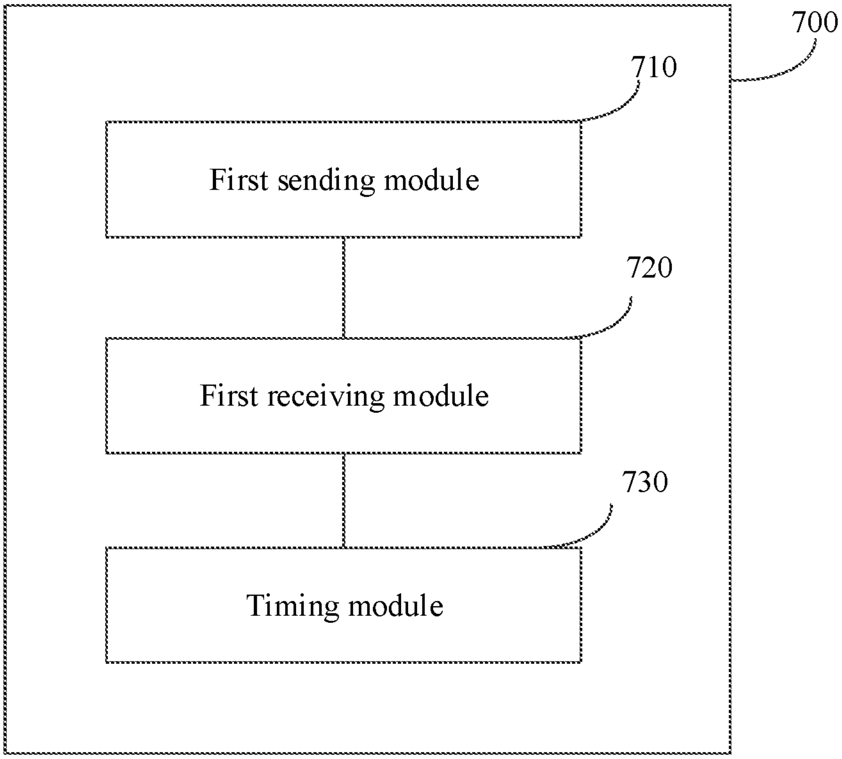

FIG. 7*b* is another schematic structural diagram of a system message transmission apparatus according to an embodiment of the present invention. As shown in FIG. 7*b*, the system message transmission apparatus 700 further includes: a timing module 730.

In an implementation, the timing module 730 is configured to: in a case that the prohibit timer for allowing the dedicated SI or SIB request has been configured, after the first request for system information SI or SIB is sent to the relay terminal, start or restart the prohibit timer; and stop the prohibit timer after the target SI or SIB sent by the relay terminal is received.

In an implementation, the timing module 730 is configured to: before the target SI or SIB sent by the relay terminal is received, stop the prohibit timer in a case that a stop timing condition is satisfied, where the stop timing condition includes at least one of the following conditions: that radio link transmission fails on a sidelink to the relay terminal; that a PC5 connection to the relay terminal has been released; and that a reselection condition for the relay terminal is satisfied.

In an implementation, the first request includes at least one of the following content: a SI or SIB requirement of the remote terminal; and a first RACH resource configuration.

In an implementation, a sending mode of the first request is at least one of the following sending modes: sending by using a PC5 radio resource control RRC message; sending by using an information element in a PC5 RRC message; and sending by using a Uu RRC container in a PC5 RRC message.

In an implementation, a sending mode of a SI or SIB forwarded by the relay terminal is at least one of the following sending modes: sending by using a PC5 radio resource control RRC message; sending by using an information element in a PC5 RRC message; and sending by using a Uu RRC container in a PC5 RRC message.

The system message transmission apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The system message transmission apparatus in this embodiment of this application may be an apparatus with an operating system. The operating system may be an Android operating system, an iOS operating system, or other possible operating systems, and is not specifically limited in the embodiments of this application.

For the apparatus 700 in this embodiment of the present invention, refer to the processes executed by the remote terminal in the methods 200 to 500 in the corresponding embodiments of the present invention, and the units or modules of the apparatus 700 and other operations and/or functions described above are used to implement the corresponding processes executed by the remote terminal in the methods 200 to 500, with the same or equivalent technical effects achieved. For brevity, details are not repeated herein.

Figure 8A:
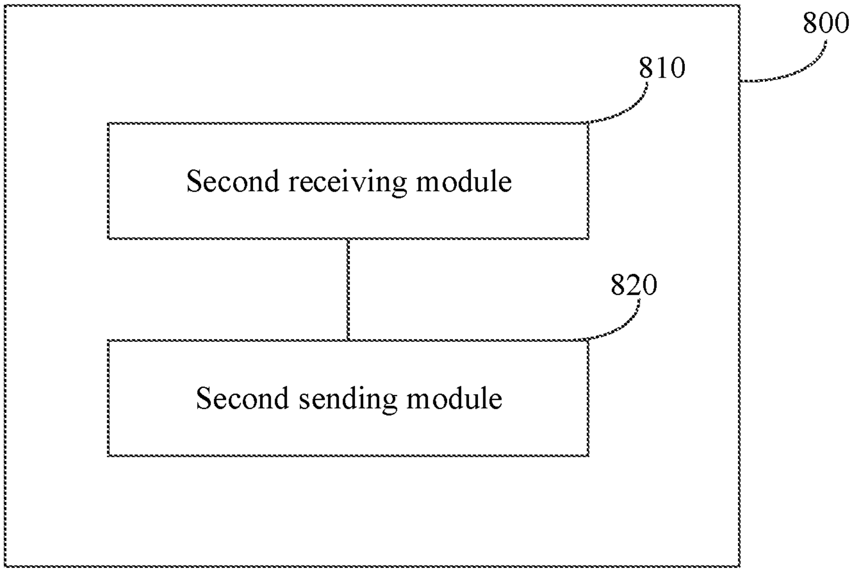
FIG. 8*a* and FIG. 8*b* are schematic structural diagrams of a system message transmission apparatus according to an embodiment of the present invention.

FIG. 8*a* is a schematic structural diagram of a system message transmission apparatus according to an embodiment of the present invention. As shown in FIG. 8*a*, the system message transmission apparatus 800 includes: a second receiving module 810 and a second sending module 820.

The second receiving module 810 is configured to receive a first request for system information SI or system information block SIB sent by a remote terminal. The second sending module 820 is configured to send a target SI or SIB to the remote terminal.

In an implementation, the second sending module 820 is configured to perform at least one of the following: in a case that a stored SI or SIB matches a system message currently broadcast by a network device, sending the stored SI or SIB to the remote terminal; in a case that the stored SI or SIB does not match the system message currently broadcast by the network device, sending a second request for SI or SIB to the network device to obtain the target SI or SIB; and in a case that no SI or SIB is stored, sending a second request for SI or SIB to the network device to obtain the target SI or SIB.

In an implementation, the second sending module 820 is configured to: send the second request for SI or SIB using a first RACH resource in the first request; or send the second request for SI or SIB using a second RACH resource configured by a network.

Figure 8B:
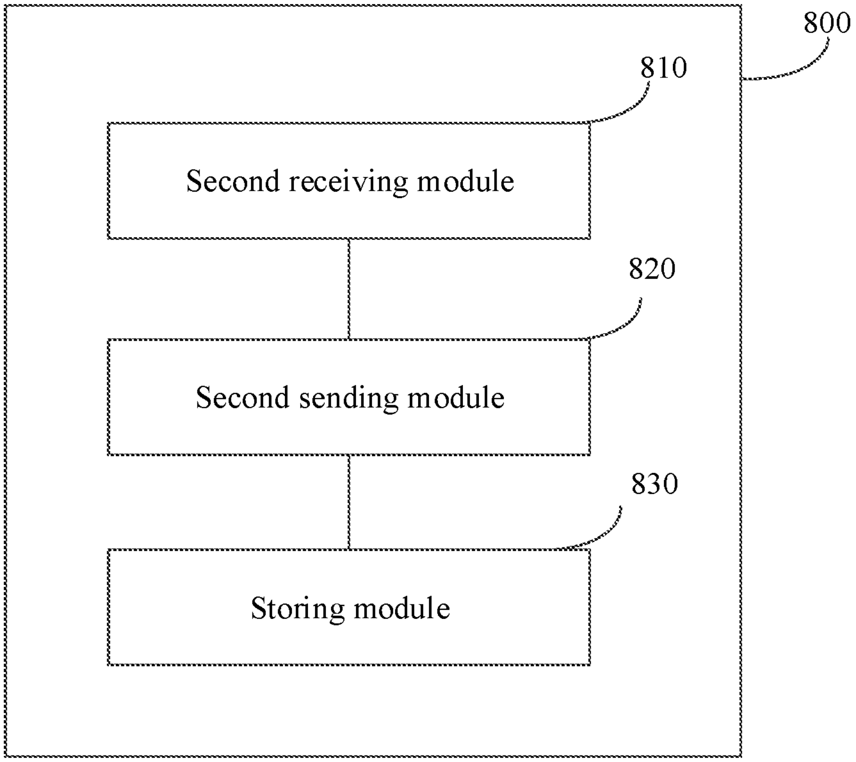

FIG. 8*b* is a schematic structural diagram of a system message transmission apparatus according to an embodiment of the present invention. As shown in FIG. 8*b*, the system message transmission apparatus 800 further includes: a storing module 830.

The storing module 830 is configured to store the target SI or SIB after the second request for SI or SIB is sent to the network device to obtain the target SI or SIB.

In an implementation, the second receiving module is configured to: in a case that a first trigger condition is satisfied, receive the target SI or SIB sent by the network device through broadcast or by using dedicated RRC signaling, where the first trigger condition is at least one of the following conditions: Uu quality being lower than a predetermined threshold; the remote terminal being located out of network coverage; a PC5 connection to the relay terminal having been established successfully; predetermined indication information from an upper layer to an access stratum having been received; and a first RACH resource for transmitting the first request for SI or SIB having been configured by a network or preconfigured.

In an implementation, the predetermined indication information includes at least one of the following information: notification of successful establishment of a PC5-S connection to the relay terminal, information about presence of user data to be sent or received, and information about presence of upper layer signaling to be sent or received.

In an implementation, the second receiving module 810 is configured to: in a case that a second trigger condition is satisfied, receive the target SI or SIB sent by the network device by using dedicated RRC signaling, where the second trigger condition is at least one of the following conditions: that an indication for allowing a dedicated SI or SIB request has been configured; and that a prohibit timer for allowing a dedicated SI or SIB request has been configured and the prohibit timer is in a non-running state.

In an implementation, the first request for SI or SIB includes at least one of the following content: a SI or SIB requirement of the remote terminal; and a first RACH resource configuration.

In an implementation, a sending mode of the first request for SI or SIB is at least one of the following sending modes: sending by using a PC5 radio resource control RRC message; sending by using an information element in a PC5 RRC message; and sending by using a Uu RRC container in a PC5 RRC message.

In an implementation, a sending mode of sending the target SI or SIB to the remote terminal includes at least one of the following sending modes: sending by using a PC5 radio resource control RRC message; sending by using an information element in a PC5 RRC message; and sending by using a Uu RRC container in a PC5 RRC message.

For the apparatus 800 in this embodiment of the present invention, refer to the processes executed by the relay terminal in the methods 200 to 500 in the corresponding embodiments of the present invention, and the units or modules of the apparatus 800 and other operations and/or functions described above are used to implement the corresponding processes executed by the relay terminal in the methods 200 to 500, with the same or equivalent technical effects achieved. For brevity, details are not repeated herein.

Figure 9:
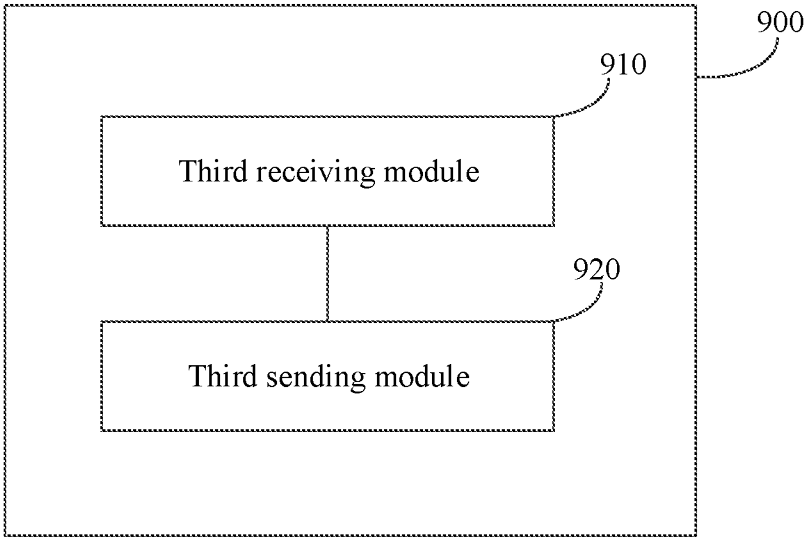
FIG. 9 is a schematic structural diagram of a system message transmission apparatus according to an embodiment of the present invention.

FIG. 9 is a schematic structural diagram of a system message transmission apparatus according to an embodiment of the present invention. As shown in FIG. 9, the system message transmission apparatus 900 includes: a third receiving module 910 and a third sending module 920.

The third receiving module 910 is configured to receive a second request for SI or SIB sent by a relay terminal, where the second request includes a SI or SIB requirement of a remote terminal. The third sending module 920 is configured to send a target SI or SIB in response to the second request.

In an implementation, the third sending module 920 is further configured to: before the second request for SI or SIB sent by the relay terminal is received, configure, for the remote terminal, a first RACH resource for transmitting a first request for SI or SIB; and/or configure, for the relay terminal, a second RACH resource for transmitting the second request for SI or SIB.

For the apparatus 900 in this embodiment of the present invention, refer to the processes executed by the network device in the methods 200 to 500 in the corresponding embodiments of the present invention, and the units or modules of the apparatus 900 and other operations and/or functions described above are used to implement the corresponding processes executed by the network device in the methods 200 to 500, with the same or equivalent technical effects achieved. For brevity, details are not repeated herein.

Figure 10:
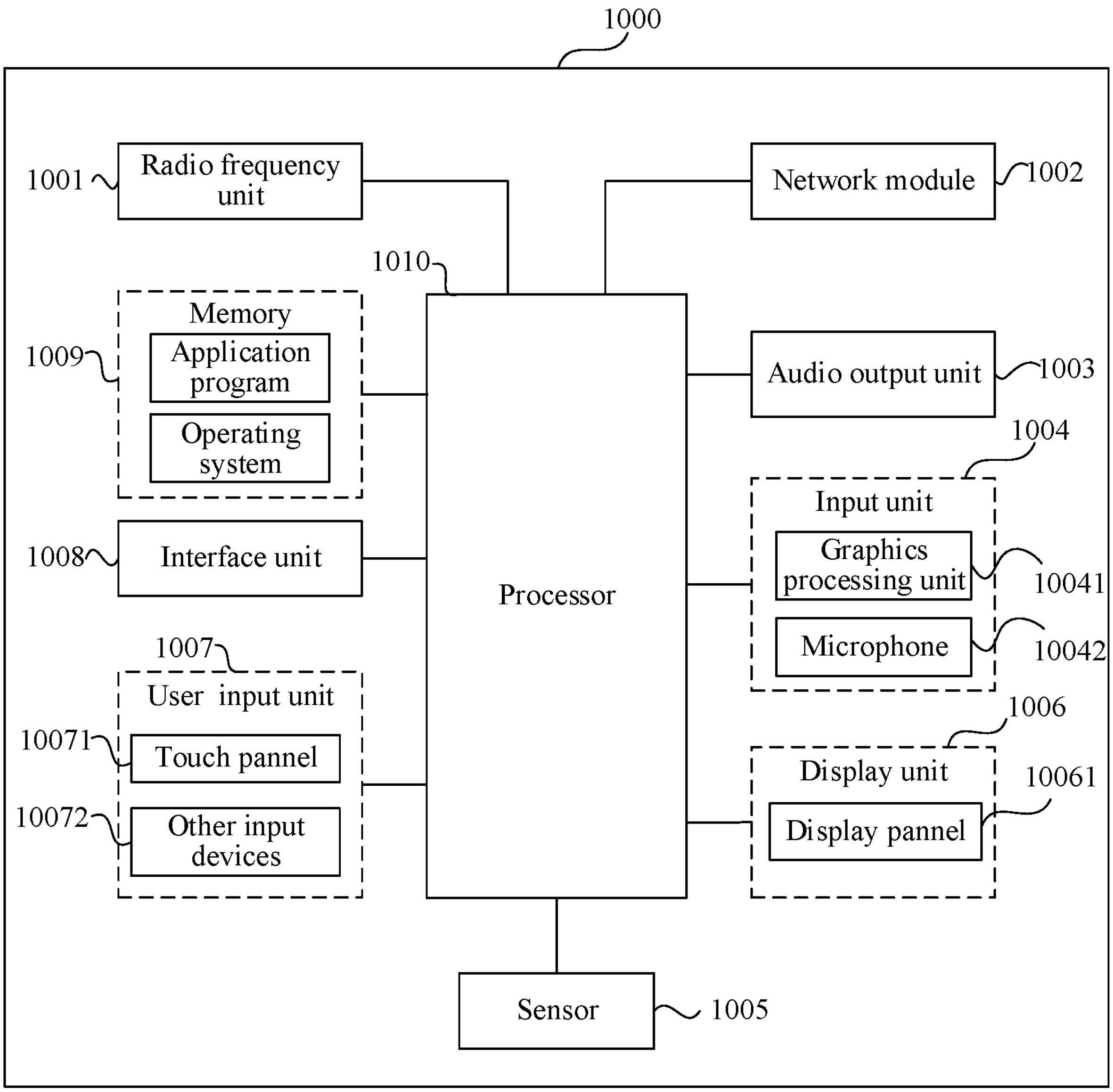
FIG. 10 is a schematic structural diagram of a terminal device according to an embodiment of the present invention.

FIG. 10 is a schematic diagram of a hardware structure of a terminal device for implementing the embodiments of this application.

The terminal device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Persons skilled in the art can understand that the terminal device 1000 may further include a power supply (for example, a battery) supplying power to the components, and the power supply may be logically connected to the processor 1010 through a power management system. In this way, functions such as charge management, discharge management, and power consumption management are implemented by using the power management system. The structure of the terminal device shown in FIG. 10 does not constitute any limitation on the terminal device. The terminal device may include more or fewer components than shown in the figure, or a combination of some components, or the components disposed differently. Details are not described herein again.

It can be understood that in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, and the like. The user input unit 1007 may include a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, and a joystick. Details are not described herein.

In this embodiment of this application, the radio frequency unit 1001 receives downlink data from a network-side device, and then sends the downlink data to the processor 1010 for processing; and also sends uplink data to the network-side device. Generally, the radio frequency unit 1001 includes but is not limited to an antenna, at least one amplifier, a transceiver, a coupler, a low noise amplifier, and a duplexer.

The memory 1009 may be configured to store software programs or instructions and various data. The memory 1009 may include a program or instruction storage area and a data storage area. The program or instruction storage area may store an operating system, an application program or instruction required by at least one function (for example, a sound playback function or an image playback function), and the like. In addition, the memory 1009 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 1010 may include one or more processing units. Optionally, an application processor and a modem processor may be integrated in the processor 1010. The application processor primarily processes an operating system, user interfaces, application programs or instructions, and the like. The modem processor primarily processes radio communication, for example, being a baseband processor. It can be understood that the modem processor may alternatively be not integrated in the processor 1010.

The processor 1010 is configured to send a first request for system information SI or system information block SIB to a relay terminal; and receive a target SI or SIB sent by the relay terminal.

In an implementation, the processor 1010 is configured to send the first request for system information SI or SIB to the relay terminal in a case that a trigger condition is satisfied.

In an implementation, the trigger condition includes at least a first trigger condition, and the first trigger condition is at least one of the following conditions: Uu quality being lower than a predetermined threshold; being located out of network coverage; a PC5 connection to the relay terminal having been established successfully; predetermined indication information from an upper layer to an access stratum having been received; and a first RACH resource for transmitting the first request for SI or SIB having been configured by a network or preconfigured.

In an implementation, in a case that the first trigger condition is satisfied, the target SI or SIB is broadcast by a network device or sent by the network device by using dedicated RRC signaling.

In an implementation, the predetermined indication information includes at least one of the following information: notification of successful establishment of a PC5-S connection to the relay terminal, information about presence of user data to be sent or received, and information about presence of upper layer signaling to be sent or received.

In an implementation, the trigger condition may further include a second trigger condition, and the second trigger condition is at least one of the following conditions: that an indication for allowing a dedicated SI or SIB request has been configured; and that a prohibit timer for allowing a dedicated SI or SIB request has been configured and the prohibit timer is in a non-running state.

In an implementation, in a case that the second trigger condition is satisfied, the target SI or SIB is sent by the network device by using dedicated RRC signaling.

In an implementation, in a case that the prohibit timer for allowing the dedicated SI or SIB request has been configured, after the sending a first request for system information SI or SIB to a relay terminal, the method further includes: starting or restarting the prohibit timer; and stopping the prohibit timer after the target SI or SIB sent by the relay terminal is received.

In an implementation, before the receiving a target SI or SIB sent by the relay terminal, the method further includes: stopping the prohibit timer in a case that a stop timing condition is satisfied, where the stop timing condition includes at least one of the following conditions: that radio link transmission fails on a sidelink to the relay terminal;

that a PC5 connection to the relay terminal has been released; and that a reselection condition for the relay terminal is satisfied.

In an implementation, the first request includes at least one of the following content: a SI or SIB requirement of the remote terminal; and a first RACH resource configuration.

In an implementation, a sending mode of the first request is at least one of the following sending modes: sending by using a PC5 radio resource control RRC message; sending by using an information element in a PC5 RRC message; and sending by using a Uu RRC container in a PC5 RRC message.

In an implementation, a sending mode of a SI or SIB forwarded by the relay terminal is at least one of the following sending modes: sending by using a PC5 radio resource control RRC message; sending by using an information element in a PC5 RRC message; and sending by using a Uu RRC container in a PC5 RRC message.

Alternatively, the processor 1010 is configured to receive a first request for system information SI or system information block SIB sent by a remote terminal; and send a target SI or SIB to the remote terminal.

In an implementation, the sending a target SI or SIB to the remote terminal includes at least one of the following: in a case that a stored SI or SIB matches a system message currently broadcast by a network device, sending the stored SI or SIB to the remote terminal; in a case that the stored SI or SIB does not match the system message currently broadcast by the network device, sending a second request for SI or SIB to the network device to obtain the target SI or SIB; and in a case that no SI or SIB is stored, sending a second request for SI or SIB to the network device to obtain the target SI or SIB.

In an implementation, the sending a second request for SI or SIB to the network device to obtain the target SI or SIB includes: sending the second request for SI or SIB using a first RACH resource in the first request; or sending the second request for SI or SIB using a second RACH resource configured by a network.

In an implementation, after the sending a second request for SI or SIB to the network device to obtain the target SI or SIB, the method further includes: storing the target SI or SIB.

In an implementation, the obtaining the target SI or SIB includes: in a case that a first trigger condition is satisfied, receiving the target SI or SIB sent by the network device through broadcast or by using dedicated RRC signaling, where the first trigger condition is at least one of the following conditions: Uu quality being lower than a predetermined threshold; the remote terminal being located out of network coverage; a PC5 connection to the relay terminal having been established successfully; predetermined indication information from an upper layer to an access stratum having been received; and a first RACH resource for transmitting the first request for SI or SIB having been configured by a network or preconfigured.

In an implementation, the predetermined indication information includes at least one of the following information: notification of successful establishment of a PC5-S connection to the relay terminal, information about presence of user data to be sent or received, and information about presence of upper layer signaling to be sent or received.

In an implementation, the obtaining the target SI or SIB includes: in a case that a second trigger condition is satisfied, receiving the target SI or SIB sent by the network device by using dedicated RRC signaling, where the second trigger condition is at least one of the following conditions: that an indication for allowing a dedicated SI or SIB request has been configured; and that a prohibit timer for allowing a dedicated SI or SIB request has been configured and the prohibit timer is in a non-running state.

In an implementation, the first request for SI or SIB includes at least one of the following content: a SI or SIB requirement of the remote terminal; and a first RACH resource configuration.

In an implementation, a sending mode of the first request for SI or SIB is at least one of the following sending modes: sending by using a PC5 radio resource control RRC message; sending by using an information element in a PC5 RRC message; and sending by using a Uu RRC container in a PC5 RRC message.

In an implementation, a sending mode of sending the target SI or SIB to the remote terminal includes at least one of the following sending modes: sending by using a PC5 radio resource control RRC message; sending by using an information element in a PC5 RRC message; and sending by using a Uu RRC container in a PC5 RRC message.

For the terminal device 1000 in this embodiment of the present invention, refer to the processes of the remote terminal or the relay terminal in the methods 200 to 500 in the corresponding embodiments of the present invention, and the units or modules of the terminal device 1000 and other operations and/or functions described above are used to implement the corresponding processes of the remote terminal or the relay terminal in the methods 200 to 500, with the same or equivalent technical effects achieved. For brevity, details are not repeated herein.

Figure 11:
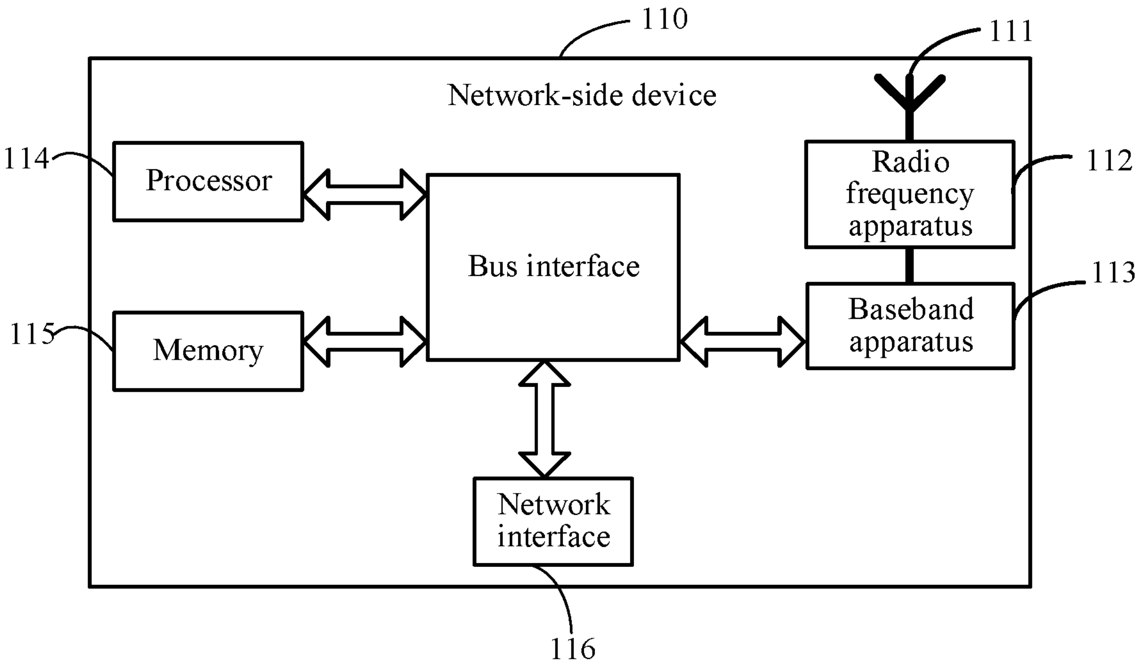
FIG. 11 is a schematic structural diagram of a network device according to an embodiment of the present invention.

Specifically, an embodiment of this application further provides a network-side device. As shown in FIG. 11, the network device 110 includes an antenna 111, a radio frequency apparatus 112, and a baseband apparatus 113. The antenna 111 is connected to the radio frequency apparatus 112. In an uplink direction, the radio frequency apparatus 112 receives information by using the antenna 111, and sends the received information to the baseband apparatus 113 for processing. In a downlink direction, the baseband apparatus 113 processes to-be-sent information, and sends the information to the radio frequency apparatus 112; and the radio frequency apparatus 112 processes the received information and then sends the information out by using the antenna 111.

The frequency band processing apparatus may be located in the baseband apparatus 113. The method performed by the network-side device in the foregoing embodiments may be implemented in the baseband apparatus 113, and the baseband apparatus 113 includes a processor 114 and a memory 115.

The baseband apparatus 113 may include, for example, at least one baseband board, where a plurality of chips are disposed on the baseband board. As shown in FIG. 11, one of the chips, for example, the processor 114, is connected to the memory 115, to invoke a program in the memory 115 to perform the operation of the network device shown in the foregoing method embodiments.

The baseband apparatus 113 may further include a network interface 116, configured to exchange information with the radio frequency apparatus 112, where the interface is, for example, a common public radio interface (CPRI).

Specifically, the network-side device in this embodiment of the present invention further includes: instructions or a program stored in the memory 115 and capable of running on the processor 114. The processor 114 invokes the instructions or program in the memory 115 to execute the steps executed by the network device in the methods 200-600, with the same technical effects achieved. To avoid repetition, details are not repeated herein.

An embodiment of this application further provides a readable storage medium, where a program or instructions are stored in the readable storage medium. When the program or instructions are executed by a processor, the processes of the foregoing embodiment of the system message transmission method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the system message transmission method, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product includes a processor, a memory, and a program or instructions stored in the memory and capable of running on the processor, and when the program or instructions are executed by the processor, the steps of the method according to the first aspect are implemented.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A system message transmission method, wherein the method is executed by a remote terminal, and the method comprises:

sending a first request for system information SI or system information block SIB to a relay terminal; and receiving a target SI or SIB sent by the relay terminal;

wherein the sending a first request for system information SI or system information block SIB to a relay terminal comprises:

sending the first request for system information SI or SIB to the relay terminal in a case that a trigger condition is satisfied;

wherein the trigger condition comprises at least a first trigger condition, and the first trigger condition comprises:

Uu quality being lower than a predetermined threshold, the remote terminal being located out of network coverage, and a PC5 connection between the remote terminal and the relay terminal having been established successfully;

wherein the trigger condition further comprises a second trigger condition, and the second trigger condition comprises:

that a prohibit timer for allowing a dedicated SI or SIB request has been configured and the prohibit timer is in a non-running state;

wherein after the sending a first request for system information SI or SIB to a relay terminal, the method further comprises:

starting or restarting the prohibit timer; and stopping the prohibit timer after the target SI or SIB sent by the relay terminal is received;

wherein before the receiving a target SI or SIB sent by the relay terminal, the method further comprises:

stopping the prohibit timer in a case that a stop timing condition is satisfied, wherein the stop timing condition comprises at least one of the following conditions:

that radio link transmission fails on a sidelink to the relay terminal;

that a PC5 connection to the relay terminal has been released; and that a reselection condition for the relay terminal is satisfied.

2. The method according to claim 1, wherein the first trigger condition further comprises:

predetermined indication information from an upper layer to an access stratum having been received; and a first RACH resource for transmitting the first request for SI or SIB having been configured by a network or preconfigured;

wherein the predetermined indication information comprises at least one of the following information:

notification of successful establishment of a PC5-S connection to the relay terminal, information about presence of user data to be sent or received, and information about presence of upper layer signaling to be sent or received.

3. The method according to claim 1, wherein the second trigger condition further comprises:

that an indication for allowing a dedicated SI or SIB request has been configured.

4. The method according to claim 1, wherein the first request comprises at least one of the following contents:

a SI or SIB requirement of the remote terminal; and a first RACH resource configuration;

or wherein a sending mode of the first request comprises at least one of the following sending modes:

sending by using a PC5 radio resource control RRC message;

sending by using an information element in a PC5 RRC message; and sending by using a Uu RRC container in a PC5 RRC message.

5. The method according to claim 1, wherein a sending mode of the target SI or SIB comprises at least one of the following sending modes:

sending by using a PC5 radio resource control RRC message;

sending by using an information element in a PC5 RRC message; and sending by using a Uu RRC container in a PC5 RRC message.

6. A system message transmission method, wherein the method is executed by a relay terminal, and the method comprises:

receiving a first request for system information SI or system information block SIB sent by a remote terminal; and sending a target SI or SIB to the remote terminal;

wherein the sending a target SI or SIB to the remote terminal comprises at least one of the following:

in a case that the stored SI or SIB does not match the system message currently broadcast by the network device, sending a second request for SI or SIB to the network device to obtain the target SI or SIB; and in a case that no SI or SIB is stored, sending a second request for SI or SIB to the network device to obtain the target SI or SIB;

wherein the obtaining the target SI or SIB comprises:

in a case that a first trigger condition is satisfied, receiving the target SI or SIB sent by the network device through broadcast or by using dedicated RRC signaling, wherein the first trigger condition comprises:

Uu quality being lower than a predetermined threshold, the remote terminal being located out of network coverage, and a PC5 connection between the remote terminal and the relay terminal having been established successfully;

wherein the obtaining the target SI or SIB further comprises:

in a case that a second trigger condition is satisfied, receiving the target SI or SIB sent by the network device by using dedicated RRC signaling, wherein the second trigger condition comprises:

that a prohibit timer for allowing a dedicated SI or SIB request has been configured and the prohibit timer is in a non-running state;

wherein, after the sending, by the remote terminal, a first request for system information SI or SIB to a relay terminal, the prohibit timer is started or restarted; and the prohibit timer is stopped after the target SI or SIB sent by the relay terminal is received by the remote terminal;

wherein before the receiving, by the remote terminal, a target SI or SIB sent by the relay terminal, the prohibit timer is stopped in a case that a stop timing condition is satisfied, wherein the stop timing condition comprises at least one of the following conditions:

that radio link transmission fails on a sidelink between the remote terminal and the relay terminal;

that a PC5 connection between the remote terminal and the relay terminal has been released; and that a reselection condition for the relay terminal is satisfied.

7. The method according to claim 6, wherein the sending a target SI or SIB to the remote terminal further comprises:

in a case that a stored SI or SIB matches a system message currently broadcast by a network device, sending the stored SI or SIB to the remote terminal.

8. The method according to claim 7, wherein the sending a second request for SI or SIB to the network device to obtain the target SI or SIB comprises:

sending the second request for SI or SIB using a first RACH resource in the first request; or sending the second request for SI or SIB using a second RACH resource configured by a network.

9. The method according to claim 7, wherein after the sending a second request for SI or SIB to the network device to obtain the target SI or SIB, the method further comprises:

storing the target SI or SIB;

wherein the second trigger condition further comprises:

that an indication for allowing a dedicated SI or SIB request has been configured.

10. The method according to claim 7, wherein the first trigger condition further comprises at least one of the following conditions:

predetermined indication information from an upper layer to an access stratum having been received; and a first RACH resource for transmitting the first request for SI or SIB having been configured by a network or preconfigured;

wherein the predetermined indication information comprises at least one of the following information:

notification of successful establishment of a PC5-S connection to the relay terminal, information about presence of user data to be sent or received, and information about presence of upper layer signaling to be sent or received.

11. The method according to claim 6, wherein the first request for SI or SIB comprises at least one of the following content:

a SI or SIB requirement of the remote terminal; and a first RACH resource configuration;

wherein a sending mode of the first request for SI or SIB is at least one of the following sending modes:

sending by using a PC5 radio resource control RRC message;

sending by using an information element in a PC5 RRC message; and sending by using a Uu RRC container in a PC5 RRC message.

12. The method according to claim 6, wherein a sending mode of sending the target SI or SIB to the remote terminal comprises at least one of the following sending modes:

sending by using a PC5 radio resource control RRC message;

sending by using an information element in a PC5 RRC message; and sending by using a Uu RRC container in a PC5 RRC message.

13. A system message transmission method, wherein the method is executed by a network device, and the method comprises:

receiving a second request for SI or SIB sent by a relay terminal, wherein the second request comprises a SI or SIB requirement of a remote terminal; and sending a target SI or SIB in response to the second request;

wherein the sending the target SI or SIB comprises:

in a case that a first trigger condition is satisfied, sending the target SI or SIB through broadcast or by using dedicated RRC signaling, wherein the first trigger condition comprises:

Uu quality being lower than a predetermined threshold, the remote terminal being located out of network coverage, and a PC5 connection between the remote terminal and the relay terminal having been established successfully;

wherein the sending the target SI or SIB further comprises:

in a case that a second trigger condition is satisfied, sending the target SI or SIB by using dedicated RRC signaling, wherein the second trigger condition comprises:

that a prohibit timer for allowing a dedicated SI or SIB request has been configured and the prohibit timer is in a non-running state;

wherein, after the sending, by the remote terminal, a first request for system information SI or SIB to a relay terminal, the prohibit timer is started or restarted; and the prohibit timer is stopped after the target SI or SIB sent by the relay terminal is received by the remote terminal;

wherein before the receiving, by the remote terminal, a target SI or SIB sent by the relay terminal, the prohibit timer is stopped in a case that a stop timing condition is satisfied, wherein the stop timing condition comprises at least one of the following conditions:

that radio link transmission fails on a sidelink between the remote terminal and the relay terminal;

that a PC5 connection between the remote terminal and the relay terminal has been released; and that a reselection condition for the relay terminal is satisfied.

14. The method according to claim 13, wherein before the receiving a second request for SI or SIB sent by a relay terminal, the method further comprises:

configuring, for the remote terminal, a first RACH resource for transmitting a first request for SI or SIB; and/or configuring, for the relay terminal, a second RACH resource for transmitting a second request for SI or SIB.

15. A terminal device, comprising a processor, a memory, and a program or instructions stored in the memory and capable of running on the processor, wherein when the program or instructions are executed by the processor, the steps of the system message transmission method according to claim 1 are implemented.

16. A terminal device, comprising a processor, a memory, and a program or instructions stored in the memory and capable of running on the processor, wherein when the program or instructions are executed by the processor, the steps of the system message transmission method according to claim 6 are implemented.

17. A network device, comprising a processor, a memory, and a program or instructions stored in the memory and capable of running on the processor, wherein when the program or instructions are executed by the processor, the steps of the system message transmission method according to claim 13 are implemented.

* * * * *